3,087,837
PROCESS FOR TREATING CELLULOSE CONTAIN-
ING TEXTILE MATERIAL WITH AN ALKYL-
ATED MELAMINE - FORMALDEHYDE REAC-
TION PRODUCT
William Julius Van Loo, Jr., Middlesex, N.J., and Jason
Melvin Salsbury, Gulf Breeze, Fla., assignors to Ameri-
can Cyanamid Company, New York, N.Y., a corpora-
tion of Maine
No Drawing. Filed May 6, 1959, Ser. No. 811,256
6 Claims. (Cl. 117—139.4)

The present invention relates to novel textile finishing resins and to the processes for treating textiles with such resins. More particularly, it relates to the treatment of cellulosic textile materials with normally water-insoluble melamine resins to impart wrinkle recovery and shrinkage control thereto.

As is well known in the textile finishing field, resins employed for the crease proofing or the impartation of wrinkle recovery to cellulosic textile materials are almost without exception water-soluble in nature. This is particularly true in so far as the use of aminoplast finishing resins are concerned. Water-solubility is an important characteristic of such resins, in that application techniques are significantly less difficult and less expensive. Thus, for example, the use of resins soluble only in a non-aqueous solvent, present solvent recovery and odor problems, and in addition the presence of solvent frequently adversely affects the hand of the finished fabric.

A number of finishes of the water-soluble resin type have been employed to impart wrinkle recovery and shrinkage control to cellulosic textile fabrics. Most successful of these resin finishes are the urea-formaldehyde, ethylene urea-formaldehyde and certain melamine-formaldehyde resin types. Each of these resins, however, possesses certain deficiencies which tend to restrict its use in certain applications.

The water-soluble urea-formaldehyde resin type, the first to be commercially successful for textile use, when applied to cellulosic fabric, causes considerable tensile strength loss when ironed or scorched following chlorine bleaching. In addition, high concentrations of the resin are required to produce desirable improvement in wrinkle recovery, which further intensifies the deleterious effects of chlorine retention.

The water-soluble melamine-formaldehyde type resins impart much higher wrinkle recovery to cellulosic fabric at a considerably lower concentration of resin solids, than in the case of urea-formaldehyde resins. In addition, they do not cause tensile strength losses on treated fabric when scorched following chlorine bleaching. They also posses considerably improved durability to usual washing and bleaching operations over the urea type resin. Certain of these resins, however, possess the deficiency of being discolored by chlorine bleaching, which tends to restrict their use on white fabrics. In addition, these and the other resin types mentioned herein tend to "firm" the hand or stiffen the fabric treated therewith, which is undesirable in many applications, particularly where a "soft" hand is preferred.

A compromise between the properties imparted by the urea-formaldehyde and melamine-formaldehyde resin types is offered by the water-soluble ethylene urea-formaldehyde resin type. This resin type imparts substantially the same wrinkle recovery obtained by certain melamine-formaldehyde type resins at the same low resin concentrations without the disadvantage of discoloring as a result of chlorine retention. However, ethylene urea type resins cause tensile strength losses intermediate to those produced by urea and melamine-formaldehyde type resins when scorched followed by chlorine bleaching. In addition, its durability to usual washing and bleaching operations is intermediate to the urea and melamine-formaldehyde type resins.

Thus, in general, melamine-formaldehyde resins are preferred for many applications, and the number of such preferred applications would be increased, particularly on white fabric, but for the discoloration resulting from chlorine retention.

Therefore, it is an object of the present invention to provide a process for treating cellulosic textile materials to crease proof the same with a unique essentially monomeric melamine-formaldehyde resin which is not normally water-soluble.

It is a still further object to provide a process for treating cellulosic textile materials to crease proof the same with such melamine-formaldehyde resins, which process substantially eliminates discoloration due to chlorine retention (from chlorine bleaching) normally experienced with some water-soluble melamine resins.

It is a further object to provide such a process which in addition imparts a surprisingly significantly softer hand to the textile fabric so finished.

It is a further and special aspect of this invention to provide a novel means for rendering the novel normally water-insoluble melamine-formaldehyde resins contemplated for use in this invention sufficiently water-soluble for crease-proofing cellulose textile materials.

Other objects and advantages of the present invention will become apparent to those skilled in the art upon consideration of the detailed disclosure set forth hereinbelow.

In accordance with the present invention, a process is provided for treating a cellulosic textile material to impart crease resistance and shrinkage control thereto, which comprises applying from between 1 and about 25% by weight of the material of a melamine-formaldehyde condensate characterized by being normally water-insoluble, substantially monomeric condensates and having the following general formula:

$$C_3N_6H_{(6-n)}(CH_2OR)_n$$

where $n$ is a positive integer having an average value of between 5 and 6 inclusive and R may be an alkyl group containing 1 to 4 carbon atoms, and thereafter curing said melamine-formaldehyde condensate on the textile material by the action of heat in the presence of a curing accelerator.

In accordance with the present specification and claims, the term "cellulosic textile material" and similar expressions as they are employed herein, refer to formed textile materials whether they are knitted, felted, woven or otherwise formed, which contain a substantial portion of cellulosic fiber, an amount in excess of 50% thereof, as for example, cotton, cuprammonium and viscose rayon, linen, jute, hemp and other cellulosic materials. Such cellulosic materials and particularly cotton, preferably are the only fiber employed in the formed textile material. However, they may be employed in blends with synthetic or natural fiber materials, as for example, acetate fibers, nylon, the acrylic fibers, the polyester fibers, wool and the like.

By the expression "normally water-insoluble" as that term is applied herein, it is means that the melamine-formaldehyde condensates contemplated herein are incapable of simple solution in water (solution by mere mixing in water) in amounts above trace amounts as for example 0.5%, based on the total weight of a solution at room temperature (25° C.) and their degree of solubility can not be increased by heating mixtures thereof in water at temperatures up to the boiling point of water.

By the expressions "substantially monomeric" or "essentially monomeric" as these terms are employed referring to the melamine-formaldehyde condensates of this invention, it is meant that the condensates are in substantially monomeric form and are substantially free from the presence of polymer. Thus, in a given melamine-formaldehyde condensate contemplated for use in the present invention, minor amounts of dimers, trimers, and the like may be present, but the materials are in general characterized as being monomeric in form.

The normally water-insoluble, substantially monomeric melamine-formaldehyde condensates contemplated for use in the present invention have the following general formula:

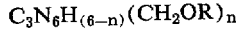
$$C_3N_6H_{(6-n)}(CH_2OR)_n$$

wherein $n$ is a positive integer having an average value of between 5 and 6 inclusive, and R is an alkyl radical containing from 1 to 4 carbon atoms. These melamine-formaldehyde condensates of the present invention are melamine-formaldehyde condensates characterized by a methylol or formaldehyde substitution of between 5 and 6 methylol groups, which material has been further condensed with a lower alkyl alcohol, methanol, ethanol, propanol, and butanol.

In addition to these condensates being normally water-insoluble, substantially monomeric materials, they are characterized in their unusable form by being a white, wax-like composition. It should be noted that melamine-formaldehyde condensates of this invention are water-insoluble, not by virtue of the fact that the condensates are polymerized, for they are essentially monomeric, but by virtue of the fact that the high degree of substitution therein renders these materials normally water-insoluble.

As will be seen more clearly hereinafter, by a particular aspect of this invention, these resins are rendered water-soluble to a sufficient order of magnitude to permit their use in textile finishing.

Because of the fact that these melamine-formaldehyde condensates are normally water-insoluble, and therefore would not normally be considered for use in textile finishing, it is quite unexpected that their employment in textile finishing results in unexpected and improved properties for materials so treated therewith with respect to discoloration due to chlorine retention. Additionally, the results in the softening of the hand of materials so treated is unexpected. These properties are further surprising in that, in view of the physical nature of the melamine-formaldehyde condensates contemplated, it is most surprising that they would even be considered for use in crease-proofing finishes for textile material.

These aspects of the present invention will be described and illustrated more clearly hereinafter.

The melamine-formaldehyde condensates contemplated for use in the present invention may be prepared by a number of procedures. One such procedure comprises heating with continuous mixing melamine and formaldehyde in mole ratios of from 1 to 6.5 to 1 to 20, and preferably from 1 to 6.5 and 1 to 10, respectively, in the presence of about 45 to 75% (preferably from 55 to 65%) by weight of water based on the total weight of the reaction mixture while maintaining a pH of between 7.0 and 8.5 (preferably from between 7.3 and 8.3) and a temperature of between 45° C. and 75° C. (preferably 55 to 65° C.) until the reaction mixture has cleared or has become transparent. Thereafter, the temperature of the reaction mixture should be maintained from between 45 and 75° C. (preferably 55 to 65° C.) while stirring the reaction mixture without agitation until a major portion of the precipitated product is formed, after which the reaction mixture is cooled to a temperature of between 15 and 30° C. until substantially all of the product has precipitated.

The precipitated product may then be readily separated from the reaction medium by filtration, centrifuging, or the like, after which it is dehydrated as by heating at 75° C. in a rotary tumble type drier or other suitable drier or drying means, so that it may be etherified. Dehydration to a water content of less than 20% and preferably to between 5 and 15% is necessary in order to achieve the high degree of etherification characteristic of the condensates employed in this invention.

As used herein, the term "mixing" is intended to include the function of mixing and/or stirring means which are or are not accompanied by agitation. The term "agitation" in turn, is intended to include the concept of mixing so as to produce a turbulent or violent movement in the reaction mixture. Mixing or stirring with agitation using an anchor type of stirrer as an exemplary mixing means would involve the stirrer moving through the reaction mixture so as to produce violent movement therein. Mixing or stirring without agitation employing a similar stirring means would include the stirrer moving through the reaction mixture so as not to produce any violent movement therein, or to be simply passing through said mixture.

If the initial reactants are mixed with agitation, it is greatly preferred that when the reaction mixture clears, the speed of the mixing means is reduced so as to be mixing without agitation in order that the particles of methylol melamine be allowed to grow to sizes which are more readily handled by conventional solid separating means. If, when the reaction mixture clears, the said mixing means continues to mix with agitation, the product tends to precipitate from the solution more rapidly and in a much more finely divided state, which renders it more difficult to handle. Mixing without agitation may be employed throughout the present process. In such an instance, the process is more time-consuming without resulting in an improved product.

If the preferred procedure described above is employed, it is not absolutely essential to the present invention that the mixing means be adjusted so as to be mixing without agitation precisely at the moment the reaction mixture clears. While best results are achieved when the mixing means are adjusted very shortly after the clearing of the reaction mixture, such adjustments have been made with an acceptable product produced, even after the precipitated product begins to form.

To etherify the methylol melamine produced as set forth hereinabove, a mole ratio of 1 mole of said melamine-formaldehyde reaction product, dehydrated to a water content of less than 20%, and between 10 and 16 moles and preferably between 12 and 15 moles of a suitable saturated aliphatic alcohol compound, are reacted at a temperature of between 15 and 60° C. and at a pH of less than 3 until complete solution of the reactants is obtained. At this point, the pH is adjusted to from between 8 and 10 with an alkali such as caustic, potassium, hydroxide, sodium bicarbonate, or other compatible basic materials, and thereafter the solution is vacuum concentrated until a viscous syrup is formed which is substantially free of unreacted alcohol and water. Upon cooling, a solid product formed.

The resulting resin is solvent soluble as for example in xylene, benzene, and the like, but is normally "water-insoluble" within the definition of that term set forth above.

In order for these resins to be employed as crease-proofing resins, they must be rendered sufficiently water-soluble to permit such use. By "sufficiently water soluble" it is meant that the resin must be capable of entering into aqueous solution in practical concentrations, as for example, 15 to 35% solids by weight or more, based on the total weight of solution, such amounts being sufficient to permit commercial operating conditions to be employed and to readily permit the application of high solids to the textile material where this is desired. High solids for crease-proofing resins are considered as being amounts between 10 and 25% solids based on the dry weight of the textile material.

Suitable etherifying agents within the meaning of this invention include methyl, ethyl, propyl, isopropyl, isobutyl and butyl alcohols. For purposes of the present invention, methyl alcohol is greatly preferred because cost of the final product is lessened and the degree of water solubility essential is more readily achieved.

In accordance with this invention, we have found that the resinous products contemplated for use herein may be rendered sufficiently water soluble by different methods. In one of these, the wax-like solid may be pulverized and the wax-like powder added to a high speed blending device and stirring or blending effected while maintaining the temperature at from between 0 and 5° C. In order to insure maintenance of the temperature within this narrow range, the container may be placed periodically in an ice bath. When no more of the resin which is periodically added appears to dissolve, the contents of the container may be filtered and the solution analyzed for nitrogen, from which value the amount of resin in the solution can be calculated.

By such procedure, a solution of up to 35% solids of the resin contemplated by this invention may be prepared, but normally several hours are required, which enters a practical limitation on such a procedure. Further, regardless of the concentration of the solids prepared, some undissolved material will be found after completion of the stirring in the high speed blending apparatus, so that filtration and solution analysis is always required in order to determine the true resin concentration in solution.

A much simpler and greatly preferred method of effecting the solution involves the weighing out of the desired amount of resin solids, adding thereto the desired amount of water for a given application run, the water having a temperature higher than the melting point of the resin or heated to this temperature in the presence of the resin, (preferably at least 5° C. higher and usually 10 to 15° C.) and containing from between 0.1 and 1% of a non-ionic wetting agent. This reaction mixture is then stirred, although high speed stirring devices of the type contemplated in the procedure above are unnecessary and possibly even undesirable. Thereafter, this mixture is cooled to room temperature with occasional stirring, at which time complete solution is effected. Solutions of up to 35% resin solids concentration and somewhat higher can be readily effected in this manner and require only minutes, further eliminating the need for filtration and solution analysis to determine true resin concentration.

In principle, it appears that the hot water which is added, functions to melt the resin, giving the system two liquid phases. The wetting action of the non-ionic agent affects a mixing of the two phases and immediate complete solution is effected upon cooling.

Conveniently, only a portion of the water required for the desired solution may be added at the required temperature to effect melting of the resin. Then additional water containing the non-ionic agent, and having a lower temperature, may be added to give the desired amount of water for the ultimate solution. The non-ionic agent may be added to the high temperature water portion without effecting the result.

Normally, the condensates contemplated by this invention will have melting points as determined by the Parr bar method of significantly less than the boiling point of water at atmospheric pressure, and thus the process is readily carried out in conventional equipment. In general, condensates contemplated by this invention will have melting points under 90° C.

Non-ionic agents are preferred as wetting agents since the catalyst employed to cure the resin may otherwise precipitate the ionic types. The class of non-ionic agents preferred are given by the following general formula:

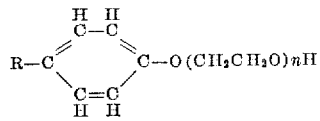

where $n$ is an integer from about 3 to 10 and higher, and R is alkyl containing from 0 to 10 carbon atoms and preferably 8 to 9.

Typical products successfully employed are the reaction products of octyl phenol and ethylene oxide ($n=6$), the type known as Triton X–100, the reaction products of nonyl phenol and ethylene oxide ($n=9$) and others.

As noted above, it is well known that textile materials may be treated with certain melamine-formaldehyde reaction products including methylated melamine-formaldehyde reaction products and that such treatment imparts increased stiffness to treated textile materials, while effecting shrinkage control and wrinkle recovery or crease proofing. This property is characteristic of the resin type and is generally more pronounced as the degree of methylolation and etherification is increased. With this as background, it therefore might reasonably be predicted that the resins contemplated by this invention would impart increased firmness to the treated fabric, as compared with lesser substituted resins, as for example, a trimethylated trimethylol melamine. In surprising distinction, however, the hand of fabric treated with resins contemplated by this invention are extremely soft, even softer than the untreated fabric, a fact wholly unexpected and contrary to predictions of those skilled in the art.

The most important characteristic of the resinous product contemplated for use in this invention, which would be unpredictable based on the knowledge and performance of methylated methylol melamine textile resins is that in the application of these resins, the tendency of textile fabrics and particularly white fabrics to discolor when subject to the action of chlorine bleaching, is substantially overcome. The fabrics treated with the product of the process set forth hereinabove, when chlorine bleached exhibit substantially no discoloration, even when subjected to a large number of bleaching cycles.

It has been found that the improved properties recited hereinabove may be imparted to textile fabrics by treating them with the resins contemplated by this invention and a suitable curing catalyst or accelerator followed by subsequent drying and curing.

The resins may be applied by conventional finishing methods, such as immersion, padding, spraying, and the like and followed, where necessary, by squeezing, hydroextraction, or similar processes, in order to affix the desired amount of resin solids onto the fabric.

The method of application should be such that from about 1 to about 25% and, in some instances, higher amounts of the resins based on the weight of the fabric, is deposited on the textile material. Within certain limits, the amount applied depends upon the particular type of textile being treated. Thus, when treating fabrics consisting of cellulosic fibrous material and particularly cotton, the concentration of the order of from about 1 to about 25%, and more, particularly from between about 3 and about 10% resin solids, based on the weight of the dried fabric is employed.

The catalyst or accelerator utilized may consist of the type comprising free acid, alkanolamine salts, metal salts, and the like. The concentration of catalyst employed may range from between about 0.1 to about 25% or higher, based on the weight of resin solids, depending upon the particular catalyst type employed. Thus, for example, from between about 0.1 and about 10% of a free acid such as phosphoric, tartaric, oxalic, or the like, may be employed, while in the case of ammonium chloride, amounts of between about 0.5 and about 10% are used. In the case of amine salts, including alkanolamine salts, from about 1.0 to about 10% are most useful, while with respect to salts such as magnesium chloride, zinc chloride and the like, amounts of between about 5 and about 25% have been successfully employed. In all instances, the concentration of catalyst is based on the weight of resin solids employed.

Following the application of the resin and curing catalyst to the textile fabric, the material is subject to the drying and curing operation to effect desired improving properties. The drying and curing operations may be carried out in a single step or in separate steps. The temperatures at which drying and curing operations are effected vary widely and are influenced, to some extent, by the type of catalyst employed. Normally, the range of temperature extends from about 180° F. to about 450° F. and even higher. Generally speaking, the time of the drying and/or curing operation is inversely proportional to the temperature employed and, of course, is influenced by whether or not separate or combined drying and curing steps are employed.

Generally, when drying and curing is carried out in a combined operation, a time from about 1 minute to 10 minutes may be employed at temperatures from about 450° F. to 250° F., respectively. When the fabric has been dried, preliminary to curing, curing times of the order of from 5 minutes to about ¼ minute, at temperatures of from between 250° F. and 450° F., respectively, have been successfully employed.

The following examples are given primarily by way of illustration so that the present invention may be more fully understood. No details therein should be construed as limitations on the present invention except as they appear in the appended claims. All parts and percentages are by weight unless otherwise designated.

*Example 1*

Into a suitable reaction vessel 386 parts (4.76 moles) of a formalin (37% formaldehyde) solution was charged and the pH of the reaction mixture adjusted to between 7.4 and 7.5 with sodium bicarbonate. The formaldehyde solution was then heated to between 55 and 60° C. and 80 parts (0.635 mole) of melamine were charged and mixed with vigorous agitation. The mole ratio of melamine to formaldehyde was 1:7.5. During solution of the melamine, the pH was found to increase to between 8.2 and 8.5 as a result of the reaction taking place. The amount of water was about 52% based on the total weight of the reaction mixture.

When the solids had gone into solution, the speed of the mixing means was greatly reduced, but sufficient to provide a low degree of mixing with little or no agitation or turbulence. The temperature of the reaction mixture was held at between 60 and 65° C. for one hour under these conditions of mixing, during which period, better than 60% of the solid methylol melamine reaction product was precipitated from the reaction mixture. After the one-hour period, cooling was initiated such that the cooling rate did not exceed 15° C. per hour. Mixing without agitation was employed during this period.

During the cooling cycle, additional water was added as required by the apparent viscosity of slurry to adjust the water content from 52% to a content of 65% based on the total weight of the reaction mixture.

After cooling to 30° C. the solids were washed with water on an Oliver rotary vacuum filter, removing approximately 80% of residual formaldehyde from the product. The washed cake was then dried at 50° C. until substantially dry to the feel. The product contained about 5% free moisture, and had a melting point of 108° C. A yield of better than 90% was realized.

*Example 2*

Three hundred and thirty parts of the methylol melamine prepared according to Example 1, 320 parts of methanol, and 10 parts of concentrated sulfuric acid sufficient to adjust the pH to between 1 and 1.5 were charged into a suitable reaction vessel. The mole ratio between the methanol and the methylol melamine was 10:1, respectively. Stirring of the reactants was continued until a slightly hazy solution was obtained. This was achieved in about one hour, and then the pH of the reaction mixture was adjusted to 8 with alkali. After this adjustment, the water and excess alcohol were distilled off in vacuo keeping the temperature below 50° C. The residue was filtered to yield a clear water-white product which upon cooling formed a solid. The yield was about 90%.

*Example 3*

Twenty-five parts of the reaction product produced according to the process set forth in Example 2 were ground with a mortar and pestle to a fine particle size and added to a Waring blender. Seventy-five parts of ice water (0° C.) were added to the mixture and it was allowed to stir for approximately 10 minutes. At this time, the temperature of the mixture had risen, both because of a higher surrounding atmospheric temperature, and because of the heat generated by the stirring action of the blender. The container of the blender was therefore removed and cooled in the ice bath to a temperature of 0° C. The container was replaced on the blender and stirring continued until solution was completed. At no time did the temperature of the stirred mixture rise above 25° C. A total stirring time of about 45 minutes was sufficient to effect complete solution. The solution obtained contained 25% solids of the reaction product made according to Example 2 and may be diluted to lower solids readily with water.

*Example 4*

Into a suitable reaction vessel 25 parts of the reaction product produced according to Example 2, 0.33 part of Deceresol NI (reaction product of nonylphenol and 9 moles of ethylene oxide) and 40 parts of water at 60° C. were charged. The above ingredients were mixed in a beaker with stirring until the solid ingredients had been completely melted, which required about 10 minutes. To this mixture, which is an unhomogeneous liquid of two phases, was added 34.67 parts of ice water at 0° C. A stable solution resulted.

In the following table, all of the fabric was padded through pad baths containing the resins and catalysts referred to therein and then treated on a microset padder set at 18 pounds per square inch to thereby obtain a wet pick-up of approximately 85%. The amount of resin applied to the fabric was 5% resin solids based on the fabric's weight and amount of catalyst was 18% based on the weight of the resin solids. The treated fabrics were dried two minutes at 225° F. and cured for 1.5 minutes at 350° F. unless otherwise stated. Fabrics being tested for shrinkage control determinations were dried and framed to size. All others were dried in the relaxed condition.

The washes referred to in the following tables consisted of a 15-minute wash cycle at 140° F. in a solution containing 0.01% soap and 0.02% available chlorine (Chlorox) at a liquid to cloth ratio of 7 to 1 in a Laundromat washer. Following bleaching, the fabrics were rinsed in water at 140° F. for three five-minute cycles and then tumble dried at from 140 to 145° F. for thirty minutes.

The various physical properties which are reported in the following tables were determined in accordance with the procedure described in the 1955 Technical Manual and Yearbook of the American Association of Textile Chemists and Colorists, volume 31.

The scorched tensile strength values were determined on fabrics bleached by the procedure described hereinabove, but scorched in accordance with tentative test method 69–52, described on pages 60 and 61 of the above cited reference. The percentage of strength loss is calculated from the initial and bleached scorch values as described in the reference.

Reflectance values for determination of color were run on a recording spectrophotometer using a magnesium carbonate block as a reference standard.

TABLE I

*Comparison of Properties of Treated Fabrics*

Cotton percale, 80" x 80", was impregnated in the general manner described hereinabove with each of the following baths:

|  | A [1] | B | C | D |
|---|---|---|---|---|
| Reaction product of Example 2 [1] (100% solids) | 58.8 |  |  |  |
| Methylated trimethylol melamine (80%) |  | 73.5 |  |  |
| Dimethylol ethylene urea (50%) |  |  | 117.5 |  |
| Dimethylol urea (60%) |  |  |  | 98.0 |
| Magnesium chloride (anhydrous) | 10.6 | 10.6 | 10.6 | 10.6 |
| Water to | 1,000 | 1,000 | 1,000 | 1,000 |
| Wet pick-up, (%) | 85 |  |  |  |
| Percent solids on fabric | 5 | 5 | 5 | 5 |
| Percent magnesium chloride on resin solids | 18 | 18 | 18 | 18 |

|  | Untreated | A | B | C | D |
|---|---|---|---|---|---|
| Reflectance (percent at 450 mμ): |  |  |  |  |  |
| Initial | 87 | 85 | 85 | 85 | 85 |
| After 25 Laundromat washes with Clorox | 87 | 85 | 56 | 86 | 86 |
| Strength loss (due to scorching, percent) | 8 | 0 | 0 | 40 | 80 |
| Available chlorine on Fabric, percent: |  |  |  |  |  |
| Initial | 0 | 0 | 0 | 0 | 0 |
| 25 Laundromat washes with Clorox | 0 | 0.25 | 1.33 | 0.86 | 1.44 |
| Hand (Initial) | Standard | Softest (Softer than Std.) | Firm | (Soft as Std.) | Soft as Std.) |

[1] Solution effected as in Example 3.

Table I hereinabove clearly demonstrates that finishing cellulose textile fabric with the normally water-insoluble, essentially monomeric resins of this invention results in substantially no discoloration due to chlorine retention and a definitely softer hand.

These textile treating compositions possess a wide variety of desirable features. They may be employed with other textile finishing resins, either thermosetting or thermoplastic, to improve the durability of such finishes. In addition, the alkylated melamine-formaldehyde reaction product may be employed with softeners, stiffeners, lubricants, dicyandiamide, and other conventional treating bath components.

This application is a continuation-in-part of corresponding application Serial No. 604,592, filed August 17, 1956, now abandoned.

We claim:

1. A process for treating cellulose containing textile material to impart crease resistance and shrinkage control thereto, which comprises applying thereto from between 1 and about 25% by weight of the material of a melamine-formaldehyde condensate characterized by being normally water-insoluble, substantially monomeric materials, and having the following formula:

$$C_3N_6H_{(6-n)}(CH_2OCH_3)_n$$

where $n$ is a positive integer, an average value between 5 and 6, inclusive, and thereafter curing said melamine-formaldehyde condensate on the textile material by the action of heat in the presence of a curing accelerator.

2. A process according to claim 1, in which from between about 2 and 15% of said melamine-formaldehyde condensate is applied.

3. A cellulose containing textile material having cured thereon from 1 to 25% based on the dry weight of the material of a melamine-formaldehyde condensate having the following formula:

$$C_3N_6H_{(6-n)}(CH_2OCH_3)_n$$

where $n$ is a positive integer, an average value between 5 and 6, inclusive said melamine-formaldehyde condensate before being cured on the fabric being characterized by being normally water-insoluble, substantially monomeric condensates.

4. A process for rendering solid, normally water-insoluble, essentially monomeric melamine-formaldehyde condensates characterized by the following general formula:

$$C_3N_6H_{(6-n)}(CH_2OR)_n$$

where $n$ is a positive integer, an average value between 5 and 6, inclusive, and R is an alkyl group containing 1 to 4 carbon atoms, sufficiently water-soluble, to be employable commercially as textile crease proofing resins which comprises melting the solid condensate with water having a temperature at least about 10° C. higher than the melting point of the condensate, to form two liquid phases, and effecting solution by cooling the two phases in the presence of a non-ionic surface active agent.

5. A process according to claim 4, in which the aqueous solution contains from between 15 and about 35% resin solids.

6. A process according to claim 4, in which the liquid phases are cooled to between 0° and 15° C. to effect solution.

References Cited in the file of this patent

UNITED STATES PATENTS

| 2,219,375 | Widmer et al. | Oct. 29, 1940 |
| 2,385,383 | Schroy | Sept. 25, 1945 |
| 2,426,770 | Guin | Sept. 2, 1947 |
| 2,454,078 | McGrew | Nov. 16, 1948 |
| 2,794,754 | Schroeder | June 4, 1957 |
| 2,827,441 | Romatowski | Mar. 18, 1958 |
| 2,839,484 | Renner | June 17, 1958 |

UNITED STATES PATENT OFFICE
CERTIFICATE OF CORRECTION

Patent No. 3,087,837 April 30, 1963

William Julius Van Loo, Jr., et al.

It is hereby certified that error appears in the above numbered patent requiring correction and that the said Letters Patent should read as corrected below.

Column 10, line 33, beginning with "4. A process" strike out all to and including "effect solution." in lines 52 and 53, same column 10.

Signed and sealed this 3rd day of December 1963.

(SEAL)
Attest:
ERNEST W. SWIDER

EDWIN L. REYNOLDS

Attesting Officer

Acting Commissioner of Patents